March 9, 1937.　　　　R. W. RINK　　　　2,073,180
COUNTERACTING SHOCK ABSORBER
Filed Oct. 3, 1934　　　　2 Sheets-Sheet 1
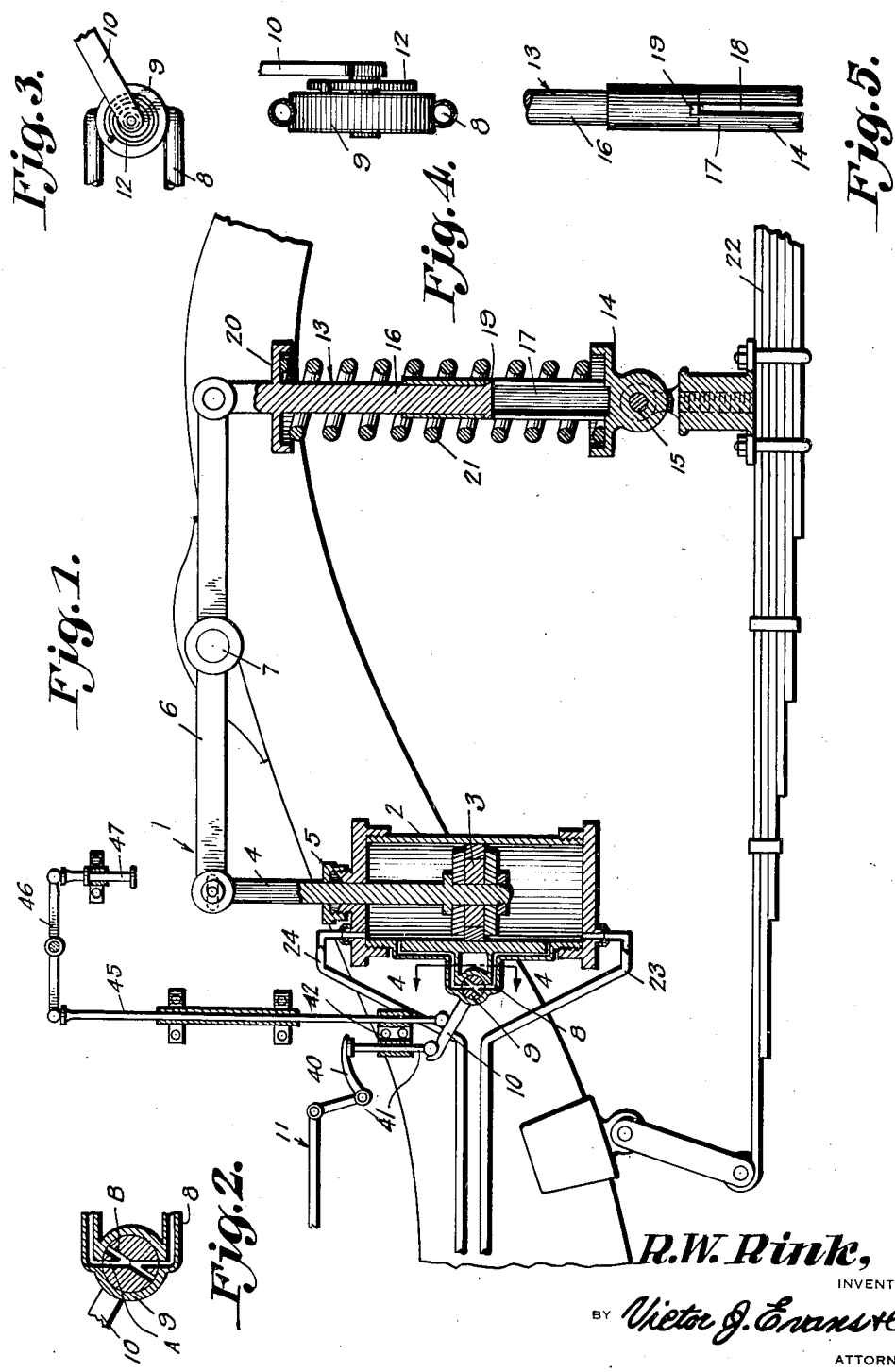
R. W. Rink,
INVENTOR March 9, 1937. R. W. RINK 2,073,180
COUNTERACTING SHOCK ABSORBER
Filed Oct. 3, 1934 2 Sheets-Sheet 2
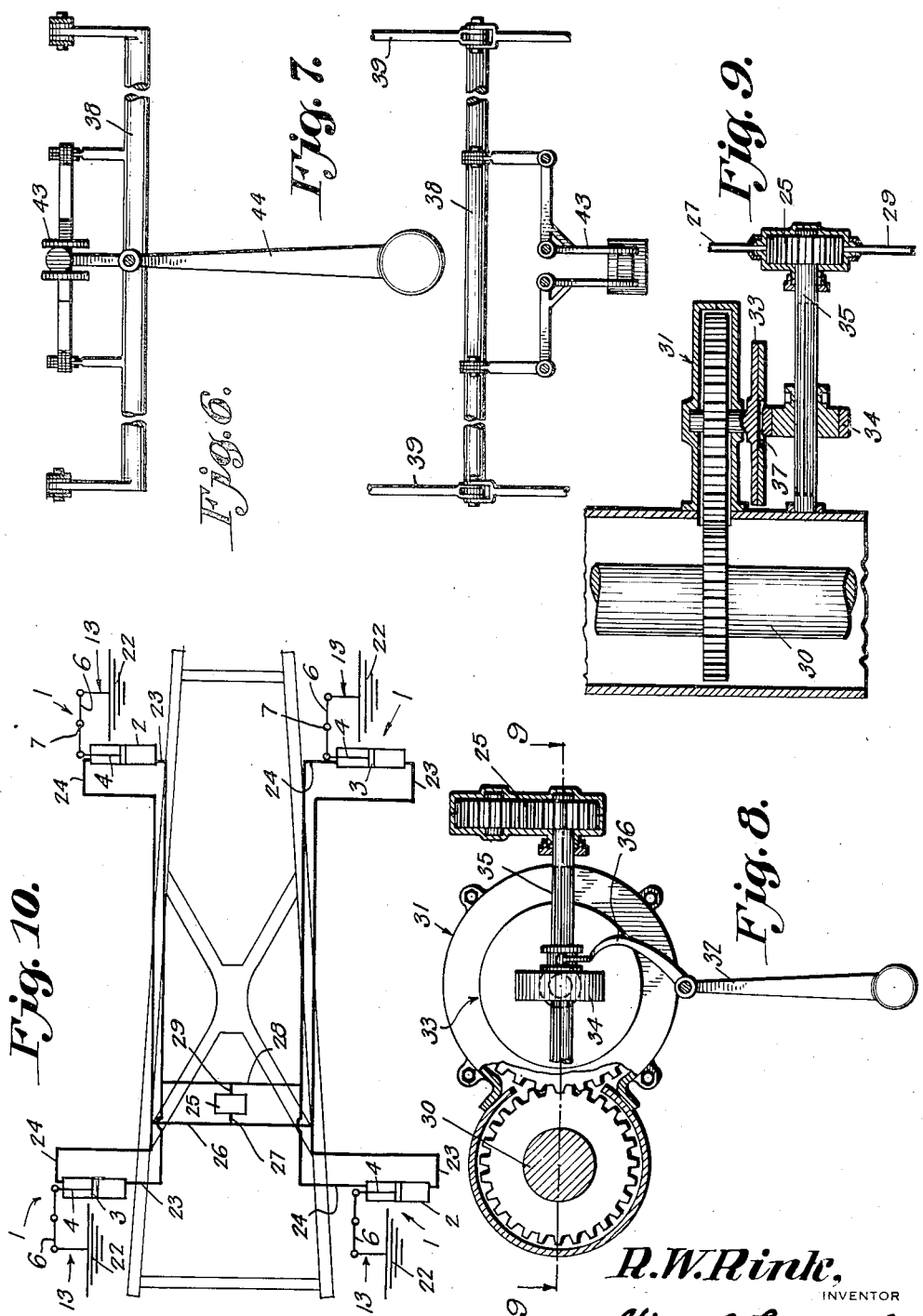
R. W. Rink,
INVENTOR
BY Victor J. Evans & Co.
ATTORNEY Patented Mar. 9, 1937

2,073,180

UNITED STATES PATENT OFFICE 2,073,180

COUNTERACTING SHOCK ABSORBER

Russell W. Rink, Coronado, Calif.

Application October 3, 1934, Serial No. 746,750

6 Claims. (Cl. 280—112)

This invention relates to shock absorbers and has for the primary object the provision of a device especially adaptable for a motor vehicle to bank the chassis and body of said vehicle on a turn so as to provide safer and more comfortable riding for the occupants of the vehicle and which will act to absorb shocks and jars of the vehicle during the travel on a straight course.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary view, partly in section, showing the application of a shock absorbing device to the chassis of a motor vehicle and constructed in accordance with my invention.

Figure 2 is a detail sectional view showing a control valve for the cylinder of a shock absorber.

Figure 3 is a fragmentary end view of the control valve.

Figure 4 is a sectional view taken on the line 4—4 of Figure 1.

Figure 5 is a fragmentary view showing a portion of the connecting arm of the shock absorber.

Figure 6 is a transverse sectional view showing a control pendulum and the operating means connected thereto.

Figure 7 is a fragmentary plan view illustrating the same.

Figure 8 is a fragmentary sectional view showing a gear pump and its drive mechanism with a power medium.

Figure 9 is a sectional view taken on the line 9—9 of Figure 8.

Figure 10 is a diagrammatical view showing the application of my invention to a motor vehicle chassis wherein the right and left hand pairs of shock absorbers are connected to the pump.

Pairs of shock absorbers are installed to the front and rear of the motor vehicle as customary in the present day constructions of such vehicle and each shock absorber consists of a cylinder 2 suitably mounted to the chassis and containing a liquid and a reciprocating piston 3, the stem 4 of which extends through a stuffing gland 5 and is pivotally and slidably connected to a walking beam 6 pivoted to the chassis, as shown at 7. The opposite faces of the piston 3 act against the liquid in the cylinder and the latter is provided with a fluid passage 8 controlled by a valve 9, the latter having an arm 10 operated in one direction by a control medium 11 which will be hereinafter more fully described. A spring 12 acts to move the arm in an opposite direction and to position the valve to open the passage 8 so that the fluid may surge from one side of the piston to the opposite side during the movement of the piston in the cylinder.

The walking beam 6 is pivoted to an arm 13 and the latter has a head 14 which is pivotally connected to the axle of the vehicle, as shown at 15. The arm 13 includes sections 16 and 17, the section 17 slidably receiving a portion of the section 16. The section 17 has oppositely arranged slots 18 receiving projections 19 on the section 16 whereby said sections may have a limited sliding movement relative to one another. The section 16 carries a head 20 similar in construction to the head 14 and interposed between the heads 14 and 20 is a coil spring 21 acting to separate the sections 16 and 17. However, said sections 16 and 17 are prevented from complete separation by the lugs 19 engaging the end walls of the slots 18. It is preferable that the strength of the spring 21 be greater than the strength of the vehicle spring, indicated by the character 22. Due to the strength of the spring 21, shocks and jars received by the axle will be transmitted to the piston 3 through the arm 13 and walking beam 6. The piston working against the liquid in the cylinder will absorb the shocks and jars and retard the rebound of the vehicle spring 22. Should the piston 3 be moved to the limit of its stroke in either direction of the cylinder by an excessive shock or jolt or an excessive movement of the vehicle spring, the spring 21 will permit a movement of the sections 16 and 17 relative to each other and thereby obviate danger of any of the parts heretofore described being broken or injured during such excessive shocks or jars with the piston at the limit of its stroke.

Pipes 23 and 24 are connected to the opposite ends of the cylinder 2. The pipes 23 and 24 comprise part of a system employed between the four shock absorbers and a gear type pump 25, connected in said system as follows: The front and rear shock absorbers at each side of the chassis of the vehicle have the upper ends of the cylinders thereof connected by the pipe 24 and the lower ends of the cylinders are connected by the pipe 23. A pipe 24 at one side of the chassis is connected to the pipe 23 at the opposite side of said chassis by a pipe 26 and the latter is connected to one of the ports of the pump 25 by a pipe 27. The pipe 23 at one side of the chassis is connected to the pipe 24 at the opposite side of the chassis by a pipe 28 and the latter is connected to a second port of the pump 25 by a pipe 29. The pump 25 is of the reversible type and is driven by a power medium which may be the drive shaft of the automobile, as indicated by the character 30. The pump 25 is connected to the drive shaft by a reversing clutch 31 automatically controlled by a pendulum 32. The clutch 31 includes a rotatably mounted disc 33 connected to the drive shaft 30 by gears and operating in conjunction with the disc 33 is a friction type gear 34 splined to the pump shaft 35 of the pump 25. The pendulum 32 is pivotally supported by the housing of the clutch 31 and is connected to the friction gear 34 by an arm 36. The central portion of the disc 33 is recessed, as shown at 37, and the pendulum 32, when the body of the automobile is level and the automobile traveling upon a straight course, positions the friction gear 34 opposite the recess 37 and thereby interrupts the drive between the drive shaft and the pump rendering the pump inoperative. The automobile when making a turn from a straight course, the pendulum 32 is caused to swing by centrifugal force in an opposite direction to the turn shifting the position of the friction gear 34 to one side of the center of said disc and out of alignment with the recess 37 and contacting with the face of the disc so that a drive is established from the drive shaft 30 to the pump for rotating the latter in one direction. A reverse movement of the pendulum 32 by the car turning in an opposite direction will position the friction gear 34 in engagement with the disc 33 at an opposite side of the recess 37 and thereby drive the pump in a reverse direction.

The valve control mechanism 11 consists of a rock shaft 38 suitably mounted to the chassis and has pivotally connected thereto forwardly and rearwardly extending rods 39 connected to bell crank levers 40, the latter being suitably mounted to the chassis and engageable with slidably mounted plungers 41 which contact with sockets in the ends of the valve arms 10. The plungers 41 are slidably supported to the chassis by brackets 42. Bell crank levers 43 are pivotally mounted to the chassis and suitably connected to the rock shaft 38 and are engaged by a pivotally mounted pendulum 44 adapted through centrifugal action to automatically close the valves 9 of the shock absorbers when the automobile turns in either direction and to open said valves when the automobile is traveling upon a straight course so that the shock absorbers may operate in the conventional manner to absorb shocks and jars.

In operation, when the automobile turns to the left, the centrifugal force swings the pendulum 32 to the right sliding the friction gear 34 from a neutral position to engagement with the clutch disc 33 establishing a drive between the drive shaft 30 and the pump for rotating the pump in a selected direction. The pendulum 44 also swings by centrifugal force and closes the valves to all four shock absorbers. The pump forces fluid into the lower ends of the cylinders of the front and rear shock absorbers on the right side of the automobile and into the upper ends of the cylinders of the front and rear shock absorbers on the left side of the automobile. At the same time the pump draws fluid out of the upper ends of the cylinders of the shock absorbers on the right side of the automobile and out of the lower ends of the cylinders of the shock absorbers on the left hand side of the automobile. The fluid forced into the shock absorbers in the manner described when the automobile is turned to the left causes the right hand side of the chassis and body of the automobile to be elevated and the left hand side of said automobile to be lowered, thereby banking the automobile body in the direction of the turn. When the automobile turns to the right the operation of the parts heretofore described is reversed, causing the left hand side of the automobile to be elevated or banked while the right hand side is lowered.

Each valve 9 is provided with diagonally arranged intersecting passages A and B. The passages A are normally in communication with the passages 8, that is, when the automobile is traveling in a straight course, so that the shock absorbers may act in the conventional manner. When the pendulum 44, due to centrifugal action, swings in either direction the passages A are moved out of communication with the passages 8 stopping the flow of fluid past the pistons of the shock absorbers, the passages B remaining out of communication with the passages 8.

To prevent jamming of the pump when the pistons reach the limit of their stroke in an upward direction safety valves are provided, each consisting of a slidably mounted plunger 45 engageable with the valve arm 10 at one and the opposite end engageable with a pivotally mounted arm 46 which also engages with a slidably mounted plunger or member 47 located directly above the stem of the piston so that when the piston of a shock absorber reaches the limit of its upward movement the piston stem thereof engages the member 47 and imparts pivotal movement to the arm 46 moving the plunger 45 downwardly. The plunger 45 in turn moves the valve arm 10 to bring the passage B of the respective valve in communication with the passage 8 allowing a by-passing of fluid by the piston which will prevent jamming of the pump.

By noting the pipe system between the shock absorbers and the pump it will be seen that by releasing the pressure of the shock absorbers on one side of the automobile the pressure is also released on the shock absorbers on the other side of the automobile, therefore, it is not necessary to employ safety devices for the pistons when moving downwardly in their respective cylinders.

Having described the invention, I claim:

1. In combination with an automobile provided with a drive shaft and having a chassis supporting a body and axles connected to said chassis by springs, double acting hydraulic shock absorbers connected to the chassis and axles for normally checking the action of said springs, a pump carried by the automobile, means connecting said pump to the hydraulic shock absorbers, centrifugally actuated means for connecting and disconnecting the pump to the power shaft, and centrifugal actuating means for rendering the normal action of the shock absorbers operative and inoperative.

2. A device of the character set forth comprising hydraulic shock absorber cylinders mounted to an automobile and having fluid passages communicating with opposite ends of said cylinders, pistons operating in the cylinders, means for connecting said pistons to the axles of the automobile, valves for controlling said passages, a hydraulic pump connected with opposite ends of the cylinders, centrifugally controlled means for connecting and disconnecting the pump with a power medium, and centrifugally controlled means for actuating the valves.

3. A device of the character set forth comprising hydraulic shock absorber cylinders mounted to an automobile and having fluid passages communicative with opposite ends of said cylinders, pistons operating in the cylinders, means for connecting said pistons to the axles of the automobile, valves for controlling said passages, a hydraulic pump connected with opposite ends of the cylinders, centrifugally controlled means for actuating the valves, and centrifugally controlled means for connecting and disconnecting the pump with a power medium and for reversing the operation of the pump in accordance with the direction of the centrifugal force affecting said last means.

4. A device of the character set forth comprising hydraulic shock absorber cylinders mounted to an automobile and having fluid passages communicative with opposite ends of said cylinders, pistons operating in the cylinders, means for connecting said pistons to the axles of the automobile, valves for controlling said passages, a hydraulic pump connected with opposite ends of the cylinders, centrifugally controlled means for actuating the valves, a reversing clutch for connecting and disconnecting the pump to a power medium, and centrifugally actuated means for operating the clutch to bring about driving of the pump in opposite directions by the power medium.

5. A device of the character set forth comprising hydraulic shock absorber cylinders mounted to an automobile and having fluid passages communicative with opposite ends of said cylinders, pistons operating in the cylinders, means for connecting said pistons to the axles of the automobile, valves for controlling said passages, a hydraulic pump connected with opposite ends of the cylinders, centrifugally controlled means for actuating the valves, a reversing clutch for connecting and disconnecting the pump to a power medium, centrifugally actuated means for operating the clutch to bring about driving of the pump in opposite directions by the power medium, and a safety means to be actuated by the pistons on the latter reaching the limit of their strokes in one direction for effecting operation of the valves to prevent choking of the pump.

6. A device of the character set forth comprising hydraulic cylinders mounted to an automobile, pistons operating in said cylinders, pivotally mounted walking beams connected to said pistons, said cylinders having passages communicative therewith at opposite sides of the pistons, valves for controlling said passages, a reversible hydraulic pump connected to opposite ends of the cylinders, means for connecting and disconnecting and reversing the operation of the pump by a power medium, centrifugally actuated means for effecting operation of the valves, arms pivotally connected to the walking beams and to axles of the automobile and each including telescopic sections, means for limiting the movement of the sections relative to each other, and spring means between the sections.

RUSSELL W. RINK.